No. 655,749. Patented Aug. 14, 1900.
E. E. ALLYNE & LE DRU R. POMEROY.
POWER MECHANISM FOR AUTOMOBILE VEHICLES.
(Application filed July 17, 1899.)
(No Model.) 6 Sheets—Sheet 1.
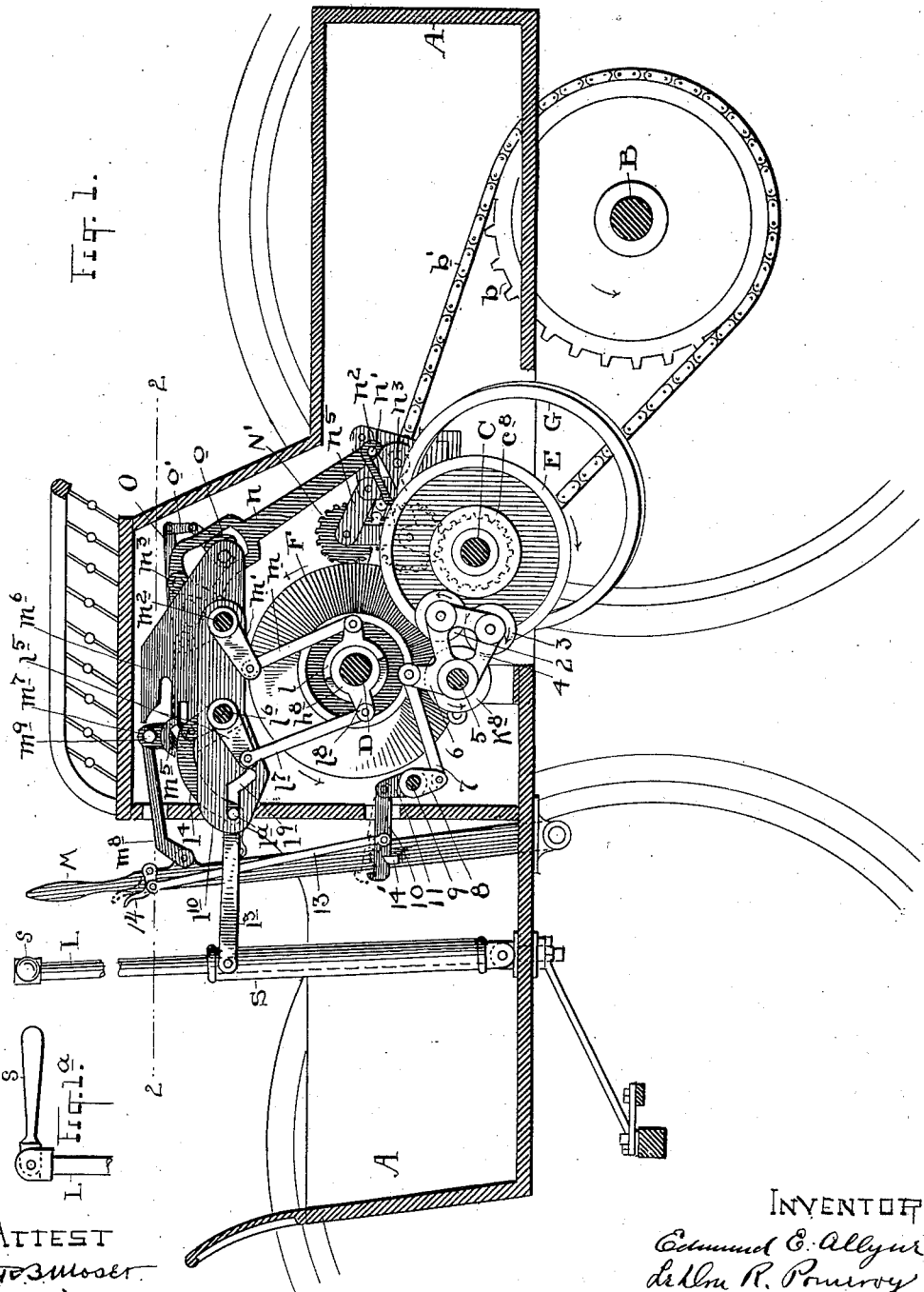
ATTEST
INVENTORS,
Edmund E. Allyne
LeDru R. Pomeroy
By W. V. Fisher ATTY

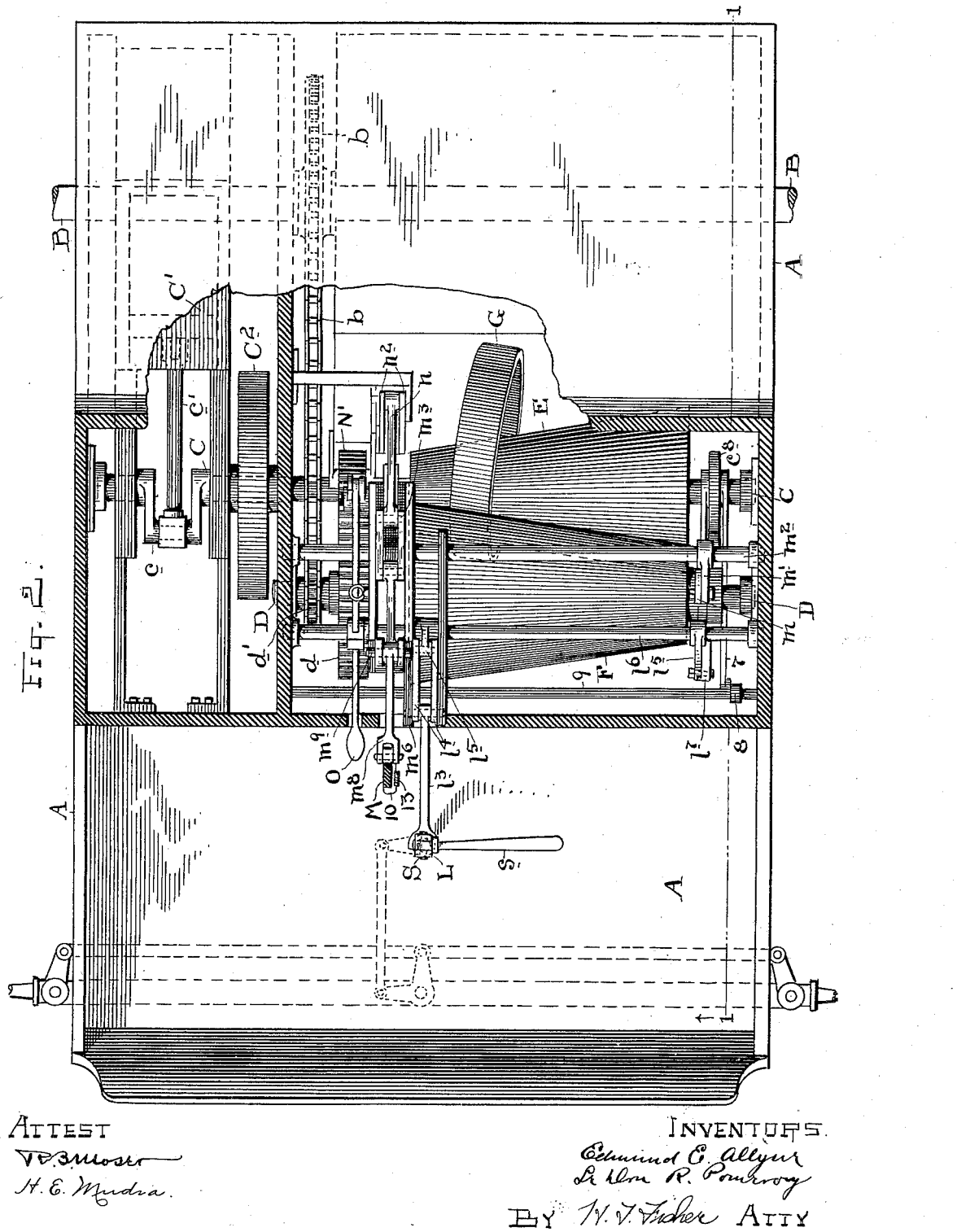

No. 655,749. Patented Aug. 14, 1900.
E. E. ALLYNE & LE DRU R. POMEROY.
POWER MECHANISM FOR AUTOMOBILE VEHICLES.
(Application filed July 17, 1899.)
(No Model.) 6 Sheets—Sheet 3.
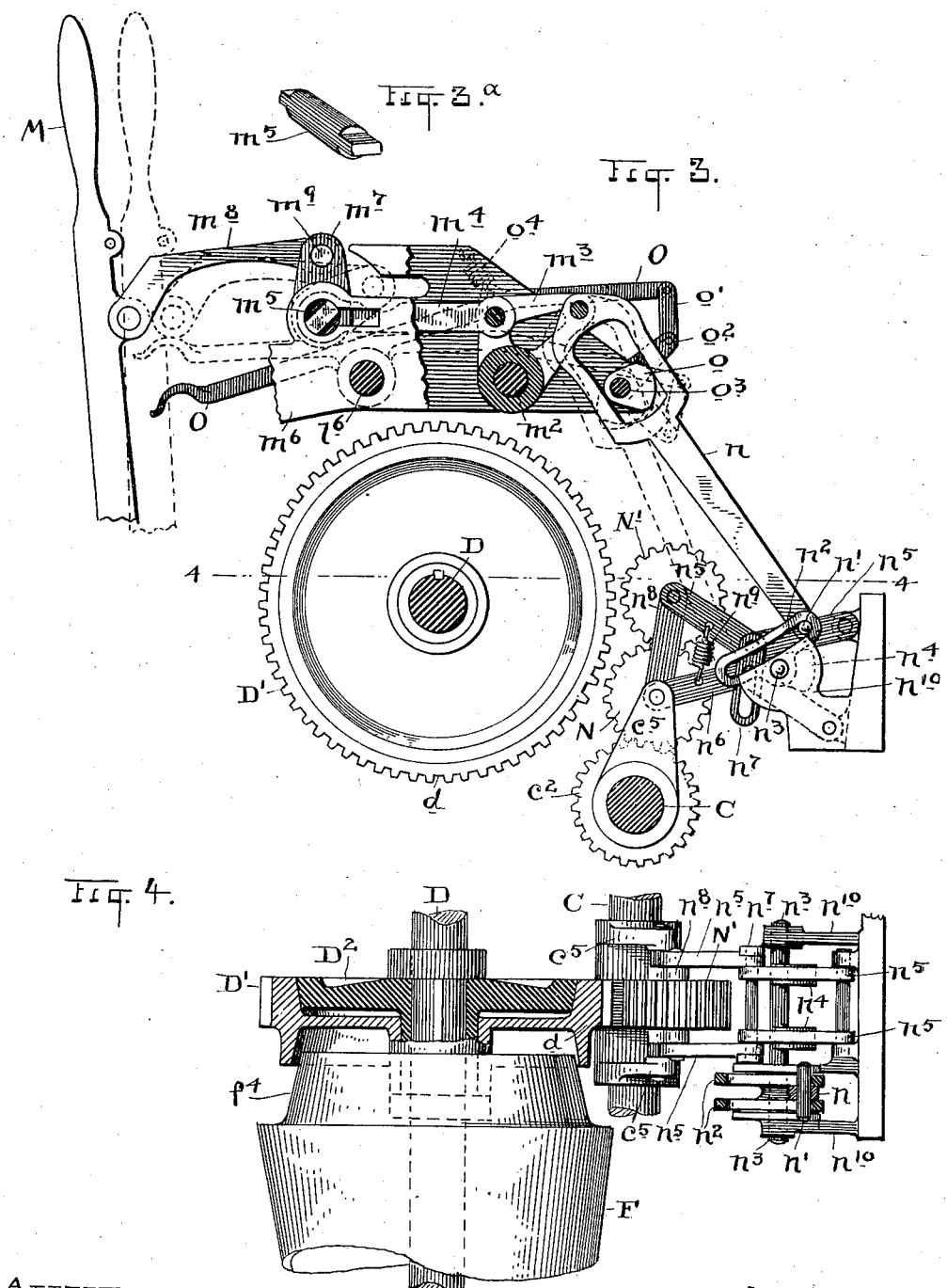

No. 655,749. Patented Aug. 14, 1900.
E. E. ALLYNE & LE DRU R. POMEROY.
POWER MECHANISM FOR AUTOMOBILE VEHICLES.
(Application filed July 17, 1899.)
(No Model.) 6 Sheets—Sheet 4.
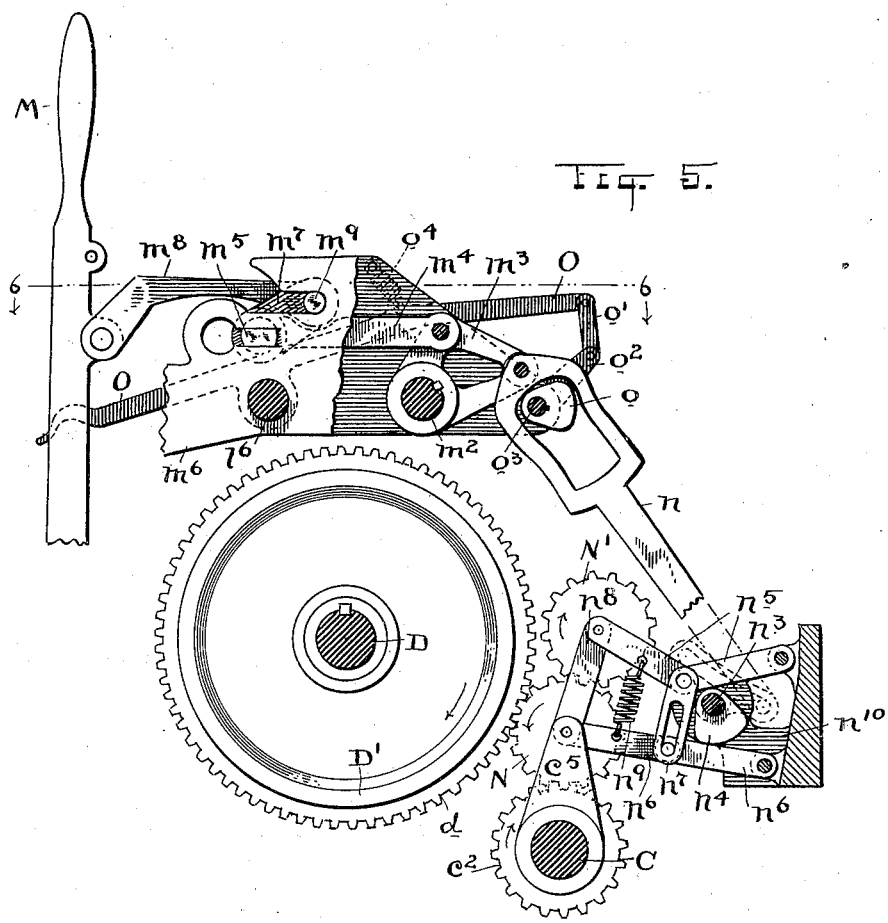
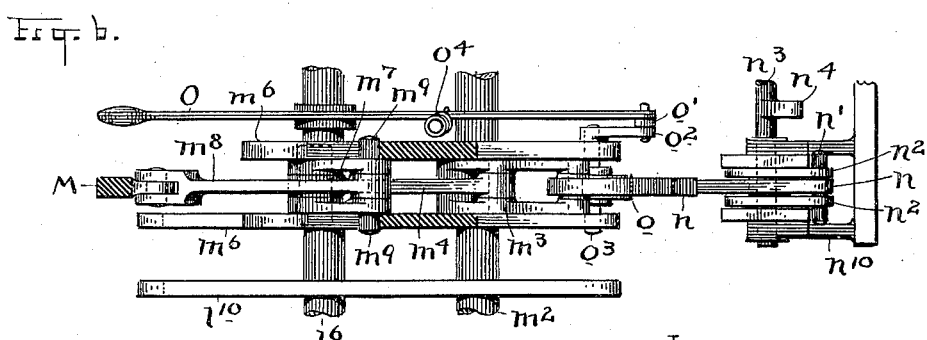

No. 655,749. Patented Aug. 14, 1900.
E. E. ALLYNE & LE DRU R. POMEROY.
POWER MECHANISM FOR AUTOMOBILE VEHICLES.
(Application filed July 17, 1899.)
(No Model.) 6 Sheets—Sheet 5.
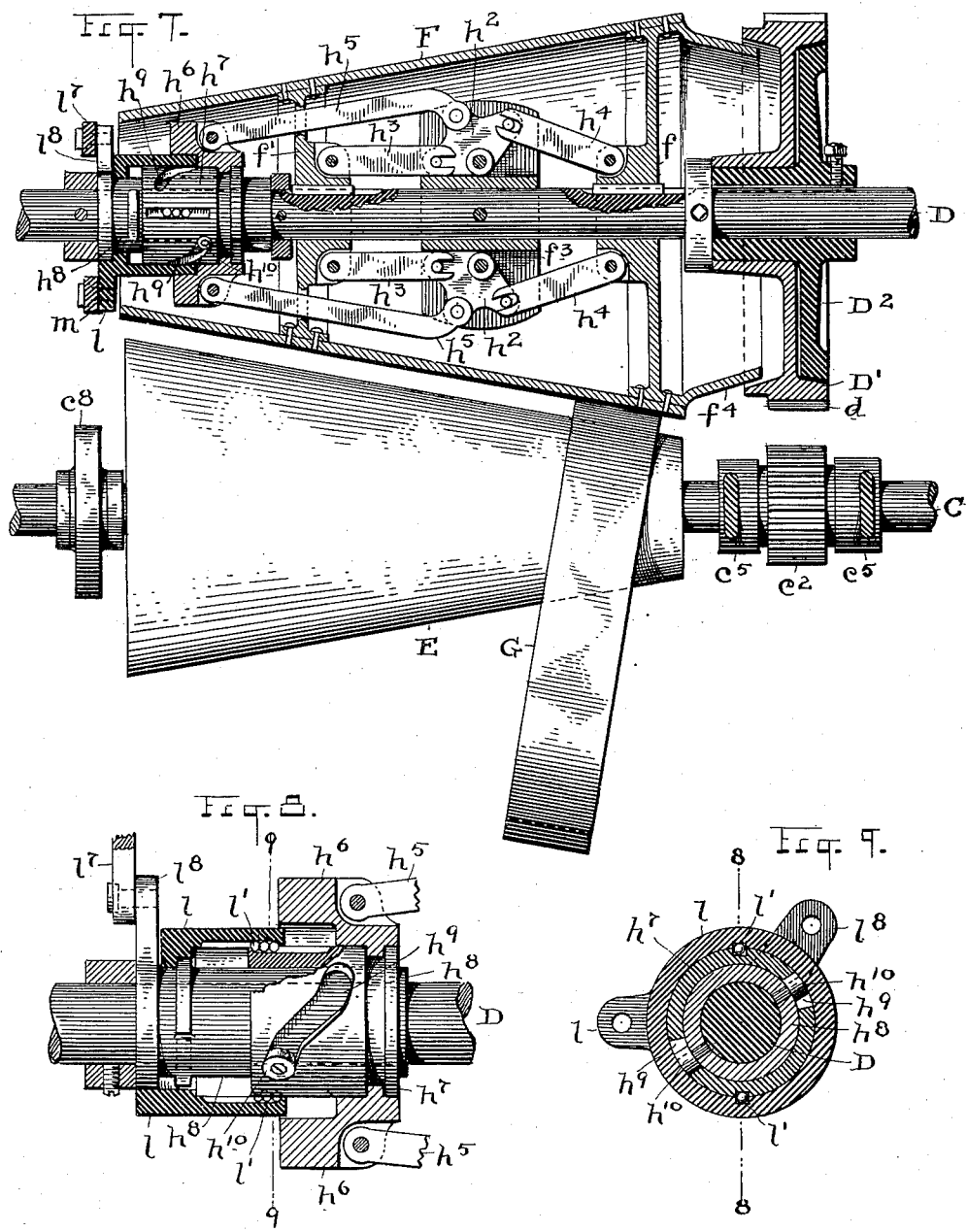

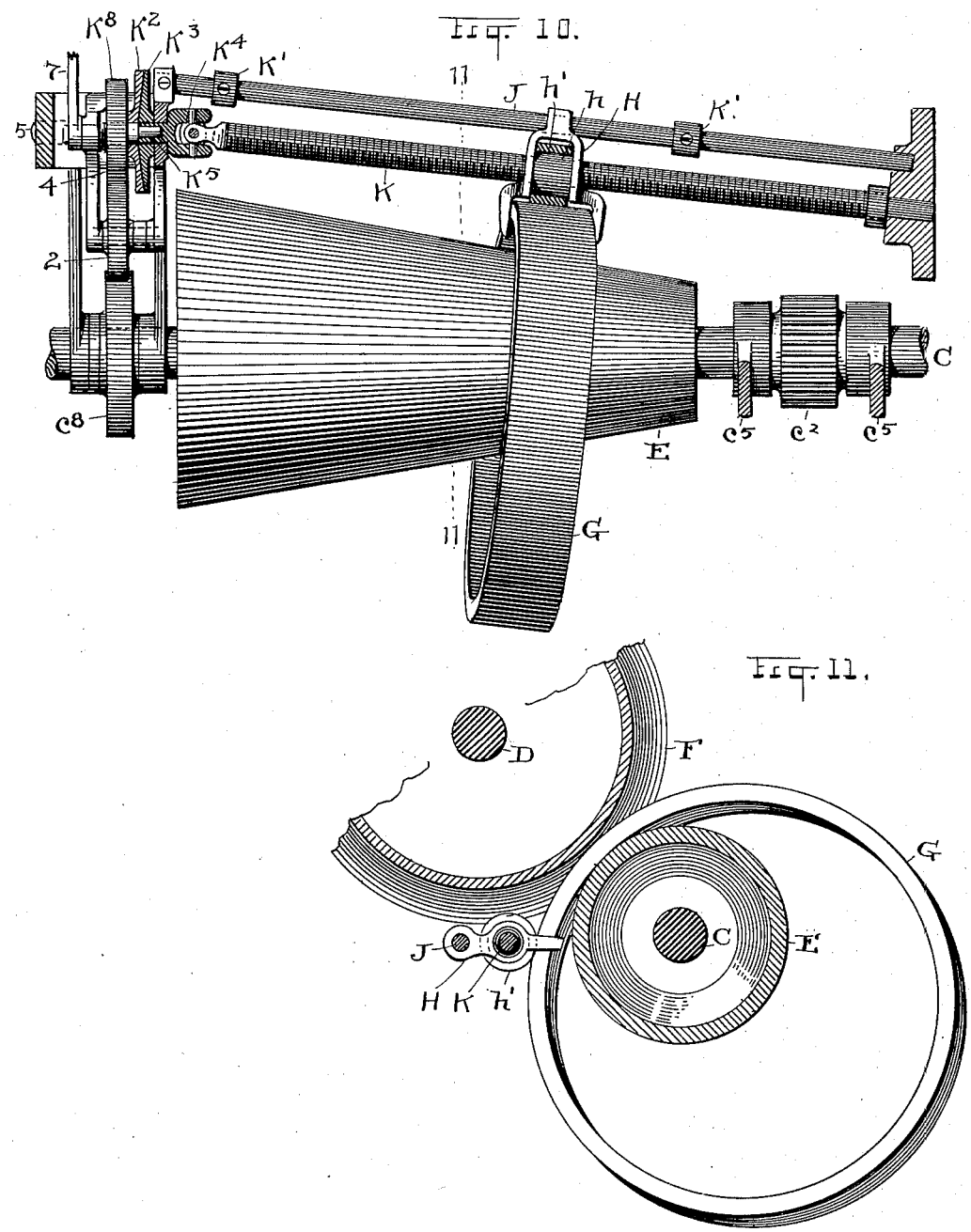

United States Patent Office.

EDMUND E. ALLYNE AND LE DRU R. POMEROY, OF CLEVELAND, OHIO.

POWER MECHANISM FOR AUTOMOBILE VEHICLES.

SPECIFICATION forming part of Letters Patent No. 655,749, dated August 14, 1900.

Application filed July 17, 1899. Serial No. 724,088. (No model.)

*To all whom it may concern:*

Be it known that we, EDMUND E. ALLYNE and LE DRU R. POMEROY, citizens of the United States, residing at Cleveland, in the county of Cuyahoga and State of Ohio, have invented certain new and useful Improvements in Power Mechanism for Automobile Vehicles; and we do declare that the following is a full, clear, and exact description of the invention, which will enable others skilled in the art to which it appertains to make and use the same.

Our invention relates to power transmitting and controlling mechanism for automobile vehicles; and the invention consists in the construction and combination of parts, substantially as shown and described, and particularly pointed out in the claims.

In the accompanying drawings, Figure 1 is a longitudinal sectional elevation of a motor carriage or vehicle in which our invention is shown as appears on line 1 1, Fig. 2, both the immediate and the more distant parts appearing alike in elevation. Fig. 2 is a plan view of the vehicle-body with the seat portion broken away and of the mechanism looking down on a line corresponding to 2 2, Fig. 1. Fig. 3 is a side elevation of a line of mechanism for controlling the power and direction of travel, as hereinafter fully described; and Fig. 3ª is a detail of a roller in said mechanism. Fig. 4 is a plan of a part of the mechanism shown in Fig. 3 and of the gear connections therewith. Fig. 5 is a side elevation of part of the mechanism shown in Fig. 3; and Fig. 6 is a plan view on line 6 6, Fig. 5. Fig. 7 is an elevation of the two power-transmitting cones, in which the upper cone is in longitudinal section, and discloses the internal parts. Fig. 8 is an enlarged view in section of the clutch and collar mechanism at the left in Fig. 7; and Fig. 9 is a cross-section on line 9 9, Fig. 8. Fig. 10 is an elevation of the lower or driving cone and the speed-controlling ring and adjusting mechanism therefor. Fig. 11 is a sectional elevation on a line corresponding substantially to 11 11, Fig. 10, and showing a portion of the upper cone.

As thus disclosed in the views, the invention is in a sense separable into two distinct lines of mechanism—one for the application of the power to the cones and the other for controlling the said application as to the matter of speed, the stopping and starting of the vehicle, the more direct use of the power in emergencies, such as the climbing of grades and the like, and also for the reverse of the clutch mechanism which governs the cones. It will also be understood that the motive power contemplated is presumably a gasolene, naphtha, or similar engine; but the engine as such does not enter into the present invention, and hence the invention is not limited to any special source or means of power and may be employed with a steam, electric, or other prime mover. However, assuming that a gasolene or naphtha engine be employed, it is well known that one of the chief objections to these engines is the offensive odors they emit, tainting the atmosphere in a most objectionable manner wherever they go, and therefore being practically unfitted for driving in streets or parks or wherever people congregate. This objection remains notwithstanding all efforts and devices to divert or smother these odors, and, so far as we know, it is present in more or less aggravated form in the most advanced hydrocarbon-vehicles of the day. A careful study of this objection has led us to a discovery of its cause and its remedy. We have found that the objection is not necessarily an inherent one, owing to the character of the motive agent, but that it is the result more particularly of conditions which, if controlled, will work the desired remedy and produce a practically-odorless operation. Specifically, therefore, it may be stated that the odor proceeds not unavoidably from the fact of hydrocarbon gas or vapor in the engine, but from the imperfect combustion or consumption of the vapor in the explosion and the consequent discharge of the unconsumed vapor in the open air and a trail of offensive odor which unavoidably fills the path of the vehicle. Such imperfection in operation was further discovered to be associated with the higher speeds, and that when the engine was working with, say, three hundred revolutions or one hundred and fifty explosions per minute there was really no noticeable or objectionable odor emitted, and this because the operations were slow enough to obtain perfect explosions and combustion of all the vapor. Incident to this as the effect of slow and uniform speed we also avoid excessive vibration in the vehicle and undue noise and wear and tear of the parts. We have therefore projected the first part of this invention on the line of this observation and planned to get our speed not out of the engine, but out of the power-transmitting mechanism. This plan contemplates not only comparative slowness, but uniformity of speed, the rate at no time to exceed that at which no odors will be produced, and the engine may be kept at this rate constantly and evenly, whether running idle or at work, except as occasion may demand a higher speed, as for racing or the like.

Referring now to the drawings, Figs. 1 and 2, A represents a vehicle-body, B the rear axle, to which power is applied through sprocket-wheel $b$ and sprocket-chain $b'$ or their equivalent.

C is the main or power shaft, having a crank $c$ and pitman $c'$ connected therewith from an engine $C'$ of any suitable kind, but understood to be a hydrocarbon-engine in this instance. $C^2$ is a fly-wheel on this shaft, and $c^2$ a pinion thereon, and D is a counter-shaft carrying a gear $d$. A small sprocket-gear $d'$ on the counter-shaft carries the sprocket-chain $b'$, so that power delivered through main shaft C to counter-shaft D is transmitted by chain $b'$ to the vehicle. Upon these two shafts C and D, as the power-transmitting members from one to the other, are the two frictional cones or frustums of cones E and F, the cone E being fixed on shaft C, and hence is the drive-cone, and the cone F, slidably supported on shaft D, is the driven cone. These cones are in reverse relation to each other as to their ends, which brings the small end of one opposite the large end of the other and into parallel relation on their working faces or surfaces. Cone E is permanently secured to its shaft, while cone F has two substantially disk-shaped supports with hubs $f$ and $f'$ splined on shaft D and adapted to be moved axially thereon within limits to effect all the necessary movements thereof for engagement or disengagement with cone E and other parts, as hereinafter described.

Between the cones, and in the present arrangement on the cone E, is the ring-shaped friction-band G, of such width of surface as will convey the power from one cone to the other and adapted to travel as the cones revolve. The said ring is supported by a carrier H, itself supported on the rod J and screw K, and in the carrier H is a nut $h$, which is adapted to run on the said screw as the screw is rotated and cause the carrier and the band G to move back and forth thereon, according to the speed of travel desired. Stops $k'$ on rod J fix the limit of travel of the carrier to and fro, and if the screw K should continue to revolve after either of said stops is reached the strain is relieved by the friction-disks $k^2$ and $k^3$, Fig. 10. A knuckle-joint $k^4$ is provided for the near end of screw K, and the spindle $k^5$, carrying said joint and disks $k^2$ and $k^3$, is divided between said disks to make their frictional operation, as herein described, possible. A roller $h'$ on the carrier H serves to support the band G when the cones are separated and to keep the band from rubbing against the driven cone when the cone is in action with the gears, hereinafter described, and separated from cone E. When the cones are at work together, they hold the band a slight distance from the roller $h'$. The carrier H is so arranged as to bring its normal rest on cone E directly in the bearing line or bite with cone F, so that when the cones come together the ring will be in the right place to work and to turn with the least friction in the carrier.

Recurring now to Fig. 7, the hubs $f$ and $f'$ of the supporting disks or spiders carrying cone F are adapted to slide but not to rotate on shaft D, and the distance of the slide is determined by the needs of the cones to bring them into or throw them out of working relation with band G. When not in such relation, the cone E might run idle; but there would be no rotation of cone F. They are in working relation in Fig. 7.

For the purpose of operating cone F on its shaft through the stopping and starting lever we fix a collar $f^3$ on said shaft, and on the vanes of this collar are pivoted the rocking lever parts $h^2$. Two or more sets of push-links $h^3$ and $h^4$, respectively, may be used between the collar $f^3$ and the rocking parts $h^2$, three being used here, and said links have open slotted ends, one or both working at their inner ends on pins on the parts $h^2$, so that either set of links may work alone while the other set is idle, according to the direction parts $h^2$ are rocked and according also as the cones are to be brought together or separated. The said rocking parts or levers $h^2$ are operated by long links or rods $h^5$, connected with a clutch-collar $h^6$. This collar $h^6$ has free internal engagement with the rotary clutch-sleeve $h^7$, which is slipped over an inner controlling-sleeve $h^8$, adapted to be rotated on shaft D. The clutch $h^7$ has spiral grooves $h^9$, in which run small rollers or studs $h^{10}$, as may be preferred, on the inner sleeve $h^8$, so that sleeve $h^8$ in its rotary movement forces clutch $h^7$ forward, and this carries collar $h^6$ along axially to operate the links $h^5$. The clutch $h^7$ is for the time held from rotating by clutch-collar $l$ and the small antifriction-balls $l'$, running in channels in said parts, but has a direct forward-and-back movement. At another time clutch-collar $l$ may rotate, and thus actuate clutch $h^7$, as we shall see. It follows that as sleeve $l$ is turned through its lever connections the clutch $h^7$ and clutch-collar $h^6$, which control the links $h^5$, will be moved also, and the axial movement of cone F will necessarily follow, as already described. The said movements likewise will be positive, and when either set of links $h^3$ or $h^4$ is down in the horizontal position they serve as direct braces or locks to hold the cone F fixedly until purposely reversed. The opposite set of links for the time is idle.

For the actuation of initial controlling-sleeve $h^8$ in this mechanism we employ a simple line of parts (seen most clearly in Fig. 1) and proceeding from the steering, starting, and stopping lever L through links $l^3$ $l^4$, crank-lever $l^5$, fixed on shaft $l^6$, and link $l^7$ to a short arm $l^8$, rigid with said sleeve $h^8$. The links $l^3$ and $l^4$ are connected by a pin $l^a$, working at its end in substantially L-shaped slots $l^9$ in the opposite plates $l^{10}$ and $m^6$. When the said pin runs back in the straight upper part of said slots to the angle thereof, the sleeve $h^8$ is rotated to throw the cones out of operating position, and as said pin drops down in the slots it simply moves on the radius of a circle on which this part of the slots is projected, so that it ceases now to carry the cone farther, but serves as a stop and lock for the shaft $l^6$ and also to apply the brake, as may be preferred.

One function of lever M is to change the speed of the vehicle, which is done in this instance through screw K, heretofore described. To these ends a special line of lever and link connections and friction-wheels extends from lever M to main shaft C and thence to screw K, so that said screw may be turned and the speed of the machine increased or diminished by shifting the band G to and fro thereon. Only enough power is required to rotate screw K in its bearings, and this is obtained by means of a set of friction-disks 2 and 3 on a substantially-triangular frame or support 4, pivoted on a stud 5 and having an arm 6, connected by link 7 with a short lever 8 on a small shaft or stem 9. A pawl 10 is pivoted on an opposite short arm 11 on shaft 9 and is controlled by a rod 13 and a finger-lever 14, pivoted on main lever M. The pawl 10 engages a dog or lug 14' on lever M, and has its end bent behind said lever, so as to make this also a positive engagement when the lever is pressed forward. When the lever m is drawn toward the seat, the dog 14' makes positive engagement with the pawl 10 and rotates the shaft 9 in the opposite direction.

Referring to the operations of the cones, it will be seen that the same operation identically with respect to the working or not working of the cone can be effected through the lever M, which lever, however, has other functions besides operating the adjusting-cone, and of which functions the operating of the cone F may in a sense be deemed the subordinate one. However this may be, the line of connections for adjusting cone F at this time is through link $m$, connected with an arm on clutch-collar $l$ and with crank-arm $m'$ on cross-shaft $m^2$, a bell-crank $m^3$, Fig. 5, also rigid with shaft $m^2$, link $m^4$, thence to roller $m^5$, Fig. 3$^a$, and thence by link $m^8$ to lever M. The roller $m^5$ has ends with flattened sides adapted to run in open slots in the plates $m^6$, in which it is supported at its ends, and upon which roller is a rigidly-connected crank-arm $m^7$, connected by link $m^8$ to lever M. When the lever M is drawn back to position of dotted lines, Fig. 3, the roller $m^5$ is rotated sufficiently for its ends to enter the slots, as in Fig. 5; but it may have movement up to the slots without unlocking the shaft $m^2$ or affecting the working relation of the cones, because up to this it performs other functions. Then if it be desired to suspend the work between the cones and to throw in the gear connections the lever L is actuated first to disengage the cones, and thereupon the further movement of lever M may be made to carry the roller $m^5$ back into the slots. This will operate to rotate the clutch-engaging sleeve $l$ and cause the clutch $h^7$ to rotate also and travel back by bearing against the rollers $h^{10}$ in the now stationary sleeve $h^8$. Pins $m^9$ on the bell-crank $m^7$ help to steady the movements in the open slots in the side plates; but when this effect is obtained by the speed and reversing lever M it is accompanied by a further effect upon another line of mechanism. In hillwork or in hard places, where power is especially demanded rather than speed, it is desirable to have direct-acting power connections, so that the most may be accomplished that is practicable by the expenditure of a given amount of power, whether it be the maximum limit of the engine or less. To these ends we provide for throwing the cones out of mutual action, as just described, and the throwing in of the gear connections, Fig. 5, to get direct application of the power. In this direct operation, however, both shafts are utilized and one of the cones. The upper cone F has an extension $f^4$, adapted to engage a rim on the gear-wheel D', which is loosely sleeved on the hub of friction-disk D², fastened adjustably to the same shaft and on the opposite side from the cone F. This engagement being effected, the counter-shaft D is necessarily rotated, assuming that the requisite gear connections have been effected with gear D'. Ordinarily this gear is loose and free from engagement.

Now in order that the power may be applied to the gear-wheel D' to drive the vehicle in either direction we employ a set of similar pinions N and N', the lower one of which meshes with pinion $c^2$ on main shaft C, and these three pinions are in constant rotation when said shaft is in motion. Normally both pinions N and N' are out of mesh with gear D', and either may be put in mesh, according to the direction wanted, as it is frequently necessary to back a vehicle. Then, again, in emergencies when the quickest possible slowing or stopping of the vehicle is wanted this line of mechanism can be used as a powerful brake by reason of the frictional engagement of gear D' between its side members. Following the mechanism controlling the position of the said pinions we have first the long open-headed lever $n$, pivoted at its upper end to the bell-crank $m^3$, Fig. 5, and engaged at its lower end by means of a crosspin $n'$ in two segmentally-slotted yokes $n^2$, rigidly fixed on the shaft $n^3$. Normally all these parts hold the position of disengagement seen in Fig. 3, and either pinion N or N' is engaged with gear D, through the changing of the position of lever $n$ in the slot in yokes $n^2$, because on the shaft $n^3$ are a pair of cams $n^4$, which operate between two sets of links $n^5$ and $n^6$. In each set of links there are two pairs, making four links marked $n^5$ and four marked $n^6$, the latter being below and the former above in the arrangement here shown. A pivot-pin connects the meeting ends of each set of links, and a slotted coupling $n^7$ unites the ends of this pin, so that the said links are thus operatively united. At their inner ends the upper links $n^5$ are supported on the extremities of the spindle of pinion N', and the lower links $n^6$ are in like manner supported on the spindle of the lower pinion N. A pair of arms $c^5$, loose on shaft C, forms a support for both pinions, links $n^8$ reaching from one spindle to the other between the two pinions. A spring $n^9$ unites the sets of links to promote their prompt action under certain conditions. This may be displaced by a slotted cam so arranged as to operate the links positively. Now assuming that the lever $n$ is in the position Fig. 3, it will when main lever M is drawn back, as in Fig. 5, throw all the associated parts into the position seen in Fig. 5 and carry pinion N into mesh with gear D'. This is the backward or backing position and engagement for the vehicle. In taking this position shaft $n^3$ has been rotated and cams $n^4$ turned down to straighten the lower pairs of links $n^6$ and throw pinion N outward into engagement with wheel D', as shown, Fig. 5, and this is also a locked position of the parts as long as they remain this way, and the middle links $n^7$ at the same time hold the upper links down and prevent possible gear connection by pinion N'. Obviously the two pinions N and N' revolve in opposite directions. If the main lever M be now thrown forward again, all the parts will go back to normal position, as in Fig. 3, and the friction-cones will again be free to respond to the demands of the stopping and starting lever L. Meantime if it be desired to propel the vehicle positively forward the same chain of mechanism identically will be used as seen in Figs. 3 and 5 and above described, and pinion N' will take its place in mesh with gear D' by simply changing the position of cam $o$ in the slot in the head of lever $n$. To effect this change of cam, a lever O is employed, having its pivot on shaft $l^6$ and connected at its further end by link $o'$ with an arm $o^2$ on the cam-shaft $o^3$. The dotted lines, Fig. 3, show the distance of movement of cam $o$ and its associate parts and the throw of lever $n$ into the other extreme of the yokes $n^2$. When in this position and depressed, the pin $n'$ through the lever and yokes will drop behind a shoulder projecting from the frame and temporarily lock the parts in that position. A spring $o^4$ helps to raise the lever O and change the position of parts.

The two friction-disks 2 and 3 are located opposite a disk $c^8$ on the main shaft C outside the cone E, and the frame 4, carrying said disks, can be rocked sufficiently to bring either disk into action with disk $c^8$, and they are in constant contact with each other. A fourth friction-disk $k^8$ is on screw K and runs in touch with the lower disk 3. Hence the screw K will be rotated in one direction if disk 2 contacts with $c^8$ and in the opposite direction if the disk 3 contacts therewith, and it will remain still if both disks are out of contact. If the pawl 10 be raised away from dog 14, the lever M can be thrown back without affecting these parts.

We have now described the mechanism in its construction and details as here shown and not mentioned alternative or equivalent means or modifications; but obviously there may be more or less changing or substituting of all or most of the parts and a choice of equivalent or modified constructions here and there without departing from the spirit or purpose of the invention.

In connection with the friction-cones it of course is obvious that the band G is engaged in the bite of the cones and that as the ring is carried to the larger diameter of the driving-cone and to the smaller diameter of the driven cone the speed is increased, while the speed is decreased if the band be moved in the opposite direction in these respects, and that the mechanism being gearless it is also noiseless.

It should have been mentioned in connection with shaft $n^3$, Fig. 4, that said shaft is carried by the supports $n^{10}$ at its ends rigid with the frame.

The part G is shown and described as a ring-shaped band, and so it is here; but it might be an endless band adapted to travel after the manner of an endless apron and not be a ring as such. Any suitable material may be used in its construction, but leather, preferably.

By referring to Fig. 1 it will be seen that when one of the clutch-arms is revolved the other arm must necessarily be held rigid or the whole clutch would simply revolve on the shaft without operating the cone. In other words, when the shaft $l^6$ is revolved the tendency will be for it to revolve shaft $m^2$, which would draw the reverse-lever back. This it cannot do, as the flattened ends of the rolling stud $m^5$ are not in a position to enter the slides in plate $m^6$ until the reverse-lever M is purposely brought back to the reverse position. The same may be said of the L-shaped slot, for when the pin drops down in the slot on the radius of a circle, as when braking, the shaft $l^6$ cannot be affected by a movement of the reverse-lever M. When the reverse-lever is in position to operate the speed, its shaft $m^2$ is locked, so as not to be affected by a movement of the steering-lever.

The stopping and starting lever L fits inside of a tube S, as shown in Fig. 1, and revolves to the right or left, as may be wanted in steering the vehicle. It is in the center of the width of the vehicle and has a handle s extending at right angles at its top and which is so arranged that it can be thrown up and over to either side of the vehicle. In this way the operator can drive and guide the vehicle with equal convenience from either side of the seat, guiding it with the hand nearest the side of the vehicle and regulating the speed from the center. Suppose, for example, that the operator is sitting on the left side of the vehicle. If the vehicle be traveling in a forward direction and a sudden stop is desired, it is only necessary for the operator to reach forward with his right hand, taking hold of the handle near the joint and pulling it toward him, which operation disconnects the power and applies the brake without affecting the steering. A certain combined lever movement is required to throw the driven cone out of friction with the band and into friction with the gears. Each lever accomplishes one-half of this movement. Ordinarily before throwing in the reverse-lever M the steering-lever is intended to be thrown back sufficiently to disconnect the power-cone, leaving the cone in an inoperative position, as in coasting. Now a backward movement of the reverse-lever takes up the cone from its inactive or intermediate position, where the steering-lever left it, and makes the balance of the movement, forcing the cone into friction with the gears, as before described. Thus it will be seen that should the operator get excited in an emergency and throw in the reverse-lever without first drawing back the steering-lever to disconnect the power no harm will result, for the reverse-lever will only accomplish what should have been done with the other lever by making the first half of the combined movement necessary to throw in the reverse. Then to apply the reverse it is only necessary to draw back the steering-lever to complete the movement. This is a great convenience when backing into a narrow or crowded place, as the operator could first throw in the reverse-lever to first disconnect the power, and then apply the reverse with the steering-lever, thus steering and reversing with a single lever.

The mechanism is always in position to apply the reverse unless purposely changed to apply the forward gears. We arrange this mechanism in this way, as the operator might have occasion to apply the reverse hurriedly. When he would have occasion to use the forward gears, he could always do so deliberately and would have plenty of time to reach down and pull up the little hook-lever O. The first part of the movement of lever M throws in the pinion to be used before the friction is applied through the extension $f^4$, and a continuance of the movement applies the friction after the gears are in mesh, thus avoiding all shock to the gears and giving an easy start. When the further reverse has been applied through small lever O and the pin $n'$ has run to the opposite end of the slots in rocking yokes $n^2$ and dropped behind shoulder $x$, Fig. 3, it remains there in locking position until released by the mechanism already described, and when such release occurs the parts all go back to their normal or intermediate relation automatically and pin $n'$ runs back again to the opposite end of the said slots and all the said parts are restored to position, as in Fig. 3.

It will be observed that while the grooves or channels $h^9$ are practically spiral they yet have a reverse curvature at each end, which promotes the easy action of the parts, and especially facilitates the unlocking of the brace-links $h^3$ $h^4$.

What we claim as new, and desire to secure by Letters Patent, is—

1. The vehicle and the driving-engine, a pair of power-transmitting cones and a band between them, power connections from the engine to the drive-cone and power connections from the driven cone to the vehicle-axle, and a lever and mechanism to carry the driven cone out of working relation with the driving-cone, substantially as described.

2. The vehicle and the cones therein to convey the power to the vehicle, a shaft for each of said cones and link-and-lever mechanism in one of said cones about the shaft thereof to adjust it axially on the shaft, substantially as described.

3. In a power-driven vehicle, a main shaft and a counter-shaft and cones on said shafts in reverse position, and mechanism about the counter-shaft to adjust the cone thereon axially and to lock it in adjusted positions, substantially as described.

4. In a mechanism substantially as described, a pair of reversely-positioned cones and shafts carrying the same, and means in one of said cones to carry it toward and from the other cone uniformly its entire length, comprising opposite sets of links and rocking devices to operate the links and cause the cone to slide on its shaft, substantially as described.

5. In vehicle driving mechanism substantially as described, a shaft and a shifting cone thereon, a collar fixed on the shaft, a rocking member on said collar and opposite push-links engaging said member and the supports of the cone, and the said supports constructed to slide on the shaft, substantially as described.

6. The driving mechanism comprising a shaft and a cone slidably supported thereon, and means to slide the cone consisting of a rotatable sleeve directly upon the shaft, and connections between the sleeve and the cone to slide the cone comprising links to push in opposite directions, substantially as described.

7. The mechanism substantially as described for driving a vehicle comprising a set of cones and shafts therefor, and means to slide one of said cones axially consisting of levers and links within the cone about the shaft, a sliding sleeve connected with said parts, a main lever, and connections therefrom to said sleeve to actuate the sleeve and the sliding cone, substantially as described.

8. The movable cone and its shaft, and means to slide said cone comprising actuating parts and lever-and-link connections uniting the said parts with the cone, in combination with a main lever and connections with the inner of said actuating parts to rotate the same about its axis and thus cause the cone to slide back and forth on its shaft, substantially as described.

9. In a motor-vehicle, means to provide a direct application of the power thereto comprising a main shaft and a counter-shaft, and a friction-cone on the counter-shaft axially adjustable, gears connecting said shafts and the gear on the counter-shaft constructed to be frictionally actuated through said cone, substantially as described.

10. A direct-acting mechanism to drive a motor-vehicle comprising the main shaft and a counter-shaft, a gear frictionally engaged with the counter-shaft, and a cone to frictionally engage said gear, a pinion on the main shaft, and a set of adjustable pinions intermediate said pinion and gear and arranged to bring either one into mesh with the counter-shaft gear, according to the direction of travel, substantially as described.

11. Means to apply the power directly in a motor-vehicle comprising a main shaft and a pinion thereon, and a counter-shaft and loose gear, a pair of power-transmitting pinions geared together and to said main pinion, means to bring either of said transmitting-pinions into working position with the counter-shaft gear, and a slidable cone on the counter-shaft to lock the loose gear thereon, substantially as described.

12. In power-transmitting mechanism for motor-vehicles, a main shaft and a counter-shaft, gears fixed on said shafts, a set of pinions in constant mesh through one of its members with the gear on the main shaft, and mechanism to operate said pinions comprising links constructed and arranged to throw either one in mesh with the gear on the counter-shaft, substantially as and for the purpose set forth.

13. In power-transmitting mechanism for motor-vehicles, two shafts and gears thereon, a pair of intermediate pinions adapted to bring said gears into operative relation, means to pivotally connect said pinions and a different set of links for operating each pinion, whereby either may be put in mesh, substantially as described.

14. The two shafts and the gears thereon, a pair of intermediate pinions arranged to be alternately used to transmit power, link connections for said pinions, a main controlling-lever and connecting mechanism therefrom to said link connections, whereby said pinions are operated as may be elected, substantially as described.

15. The main shaft and a gear thereon, a pair of pinions in constant mesh with said gear and with each other, direct-acting links for operating each pinion, and means connecting said links, substantially as described.

16. The main shaft and its gear, a pair of intermeshing pinions having one member engaged with said gear, supports on said shaft and links carrying said pinions, and a line of mechanism constructed and arranged to advance either of said pinions to working position and to hold the other out, substantially as described.

17. In a power transmitting and reversing mechanism for motor-vehicles, a pair of intermeshing pinions links for supporting and adjusting said pinions and a lever and reversing mechanism connected directly with said links, in combination with a counter-shaft and a gear thereon to be engaged by either of said pinions at will, substantially as described.

18. In mechanism for transmitting power in motor-vehicles, a pair of intermeshing pinions, one to drive the vehicle forward and the other backward, and a counter-shaft and a loose gear thereon in meshing relation to both pinions, means to throw one pinion into a mesh at a time, and means to change said pinions, substantially as described.

19. The counter-shaft and its gear, and a cone on the shaft adapted to slide into engagement with said gear, in combination with two intermeshing pinions, a drive-gear connected with one of said pinions, means to throw either pinion into engagement with the counter-shaft gear, and means to change the engagement from one pinion to the other, substantially as described.

20. In motor-vehicle propulsion, a set of reversely-arranged cones and a band adjustable between them, a screw to carry said band, and a set of friction-disks to rotate said screw, substantially as described.

21. The screw to adjust the cone-band having a friction-wheel thereon, and means to rotate said screw comprising a set of friction-disks, a rocking support for said disks and means to rock said support, whereby either of said disks may be brought into operating position and the screw run in either direction, substantially as described.

22. The main shaft and a friction-disk thereon and the band-adjusting screw and a friction-disk thereon, a set of disks intermediate of these on a rocking support, and means to throw either of said disks into working relation with the others, substantially as described.

23. The main shaft and the band-adjusting screw and friction-disks thereon, in combination with a pair of intermediate disks and a rocking support therefor, a main lever, and means connecting said lever with said rocking support to throw either of said intermediate disks into working relation with the other two, substantially as described.

24. The vehicle and the drive and driven cones therein, in combination with means to move the driven cone axially comprising a slidable clutch, means to operate the clutch and means between the clutch and the cone to slide the cone, substantially as described.

25. In cone-operating mechanism for a motor-vehicle, a slidable clutch having substantially-spiral channels and a sleeve within the clutch having projections engaged in said channels, substantially as described.

26. The counter-shaft and a cone slidable thereon, and means to slide the cone comprising a clutch, a rotatable sleeve engaged with the clutch and mechanism connecting the clutch with the cone and the shaft, substantially as described.

27. The counter-shaft and the cone thereon, and mechanism to shift the cone on the shaft comprising a rotatable sleeve on said shaft, a direct-acting clutch having a spiral operating engagement with said sleeve, a collar on the clutch, and parts extending thence to the interior of the cone, substantially as described.

28. The counter-shaft and the cone thereon, in combination with means to slide the cone comprising a system of oppositely-arranged push-links, a slidable clutch, an engaging sleeve within the clutch and a set of collars engaged about the clutch and one of said collars connected with the said push-links, substantially as described.

Witness our hands to the foregoing specification this 15th day of July, 1899.

EDMUND E. ALLYNE.
LE DRU R. POMEROY.

Witnesses:
 H. T. FISHER,
 R. B. MOSER.